United States Patent
Dontigny

[15] 3,694,022
[45] Sept. 26, 1972

[54] FOLDING CAMPER TRAILER
[72] Inventor: Rene Dontigny, 1006 Vanier Boulevard St., St. Vincent De Paul, Quebec, Canada
[22] Filed: Oct. 23, 1970
[21] Appl. No.: 83,373

[30] Foreign Application Priority Data
　　Oct. 24, 1969　Canada......................065817

[52] U.S. Cl.........................296/23 R, 52/66, 296/27
[51] Int. Cl...............................................B60p 3/34
[58] Field of Search.................296/23, 26, 27; 52/66

[56] References Cited
UNITED STATES PATENTS
3,456,978　7/1969　Daniels......................296/27
3,458,232　7/1969　Frank..........................296/27
3,558,181　1/1971　Peterson......................296/27

*Primary Examiner*—Philip Goodman
*Attorney*—Raymond A. Robic

[57] ABSTRACT

A camper trailer entirely made of rigid panels and in which certain panels are pivotally connected to the box like base and to the top of the camper trailer to automatically take a straightened position upon raising the top. Said camper trailer has at least one drawer slidable in and out of the base and mechanism connected to the base and to the top for raising the latter and operable by movement of the drawer.

17 Claims, 25 Drawing Figures

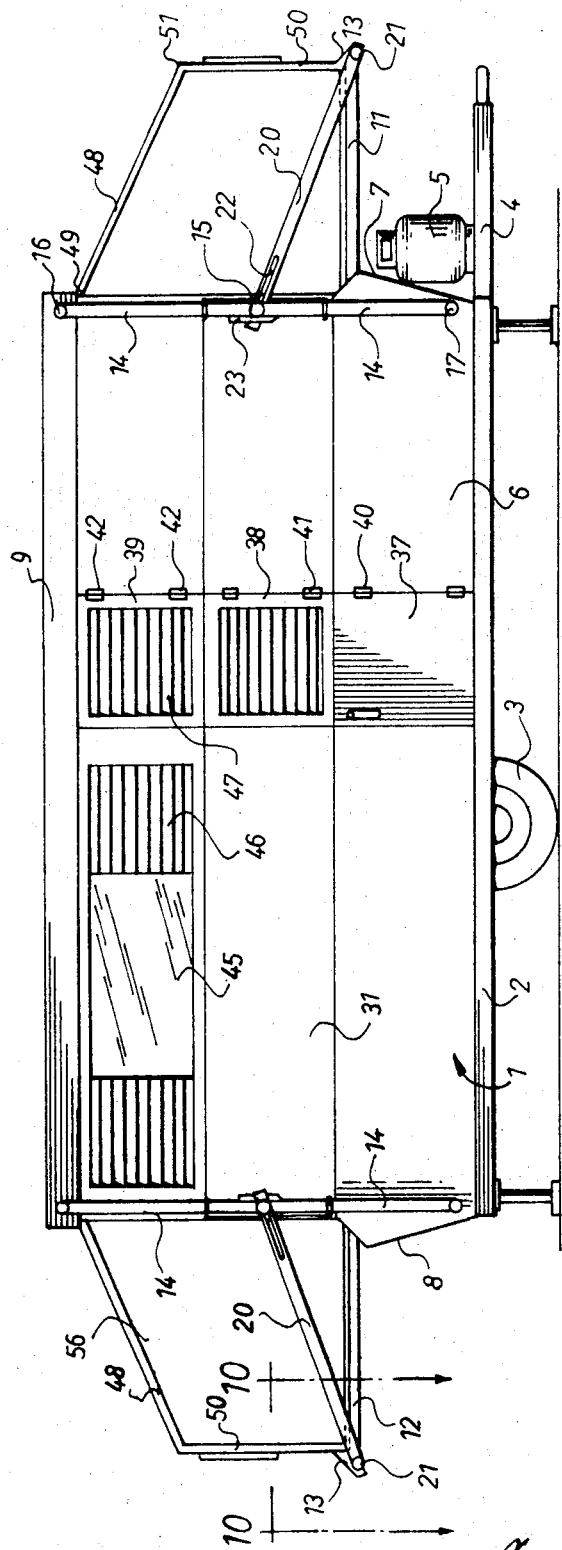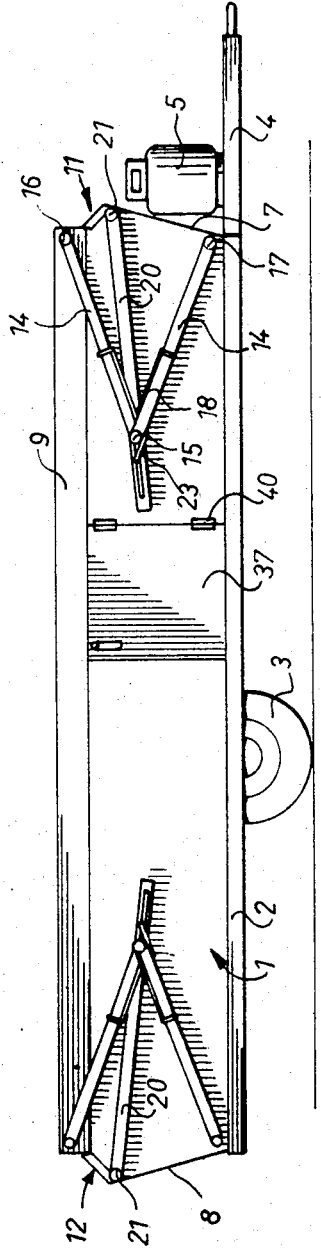
INVENTOR
René DONTIGNY
BY
ATTORNEY

INVENTOR
René DONTIGNY
BY
ATTORNEY

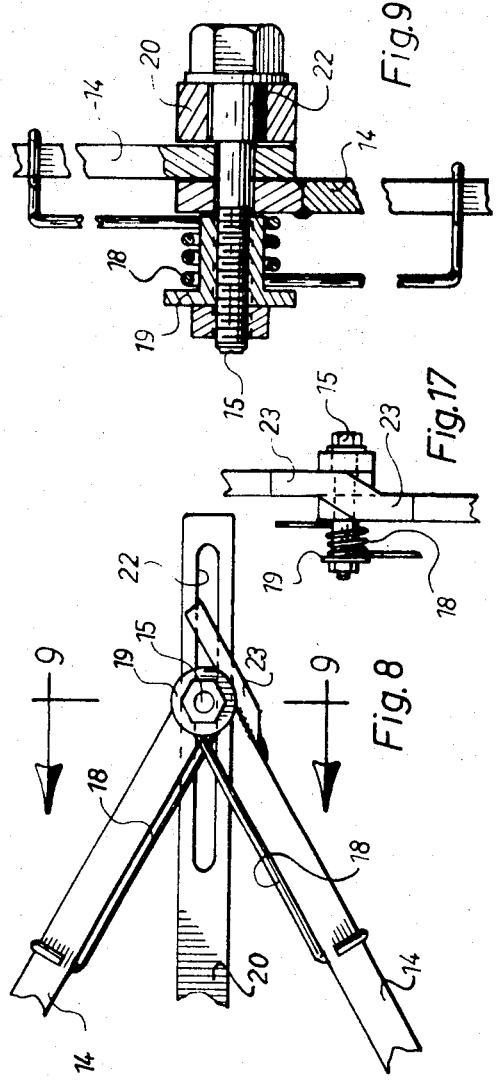
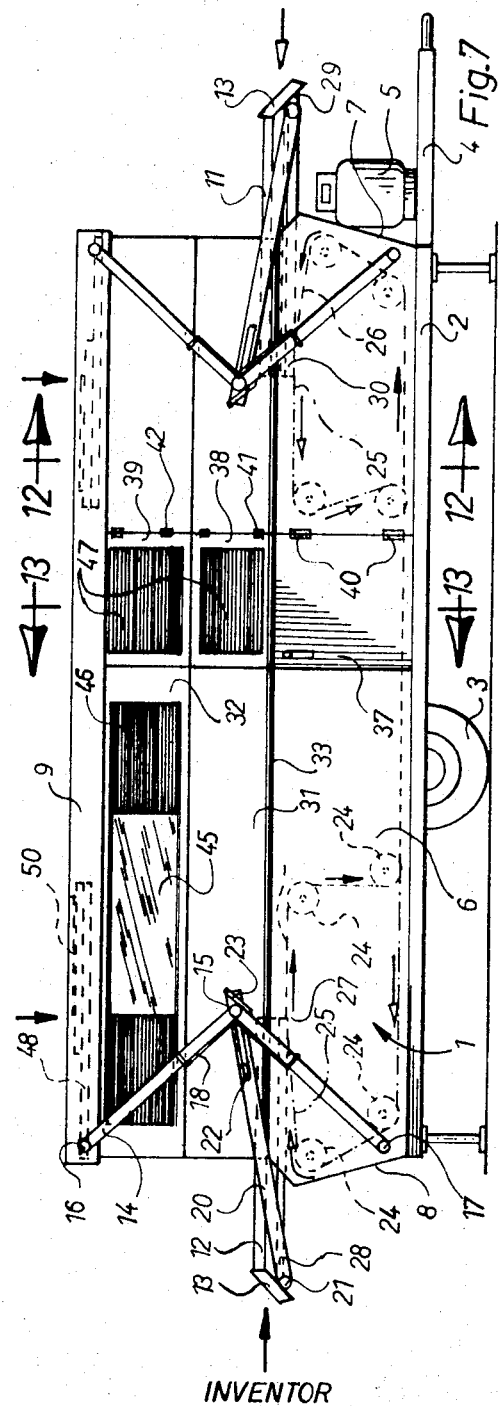

INVENTOR

René DONTIGNY

BY

ATTORNEY

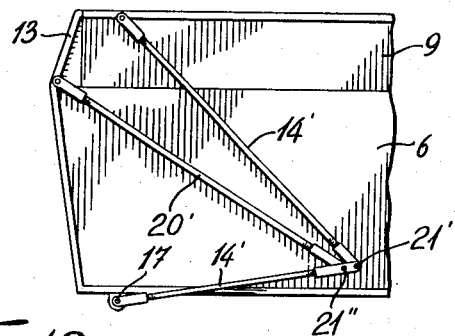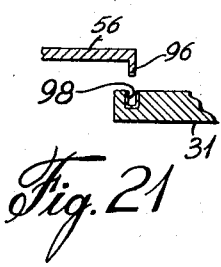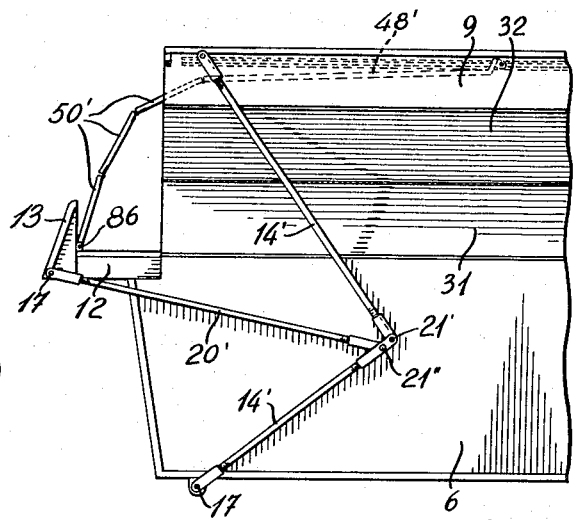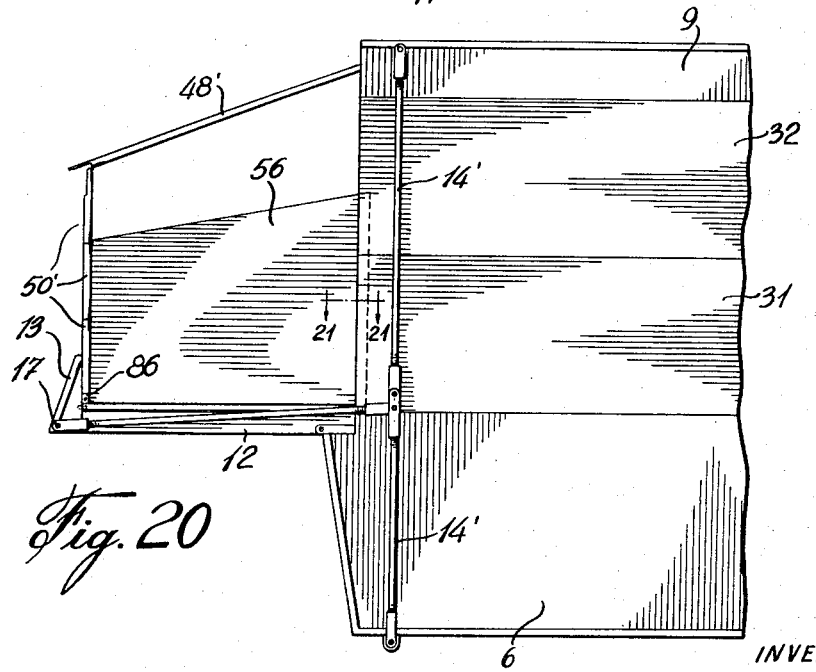

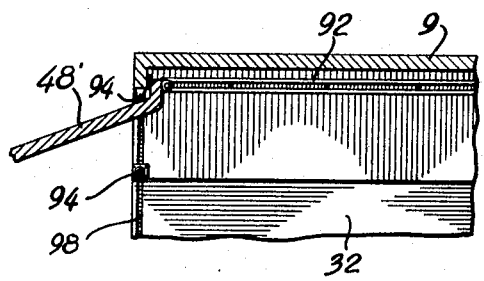
Fig.22
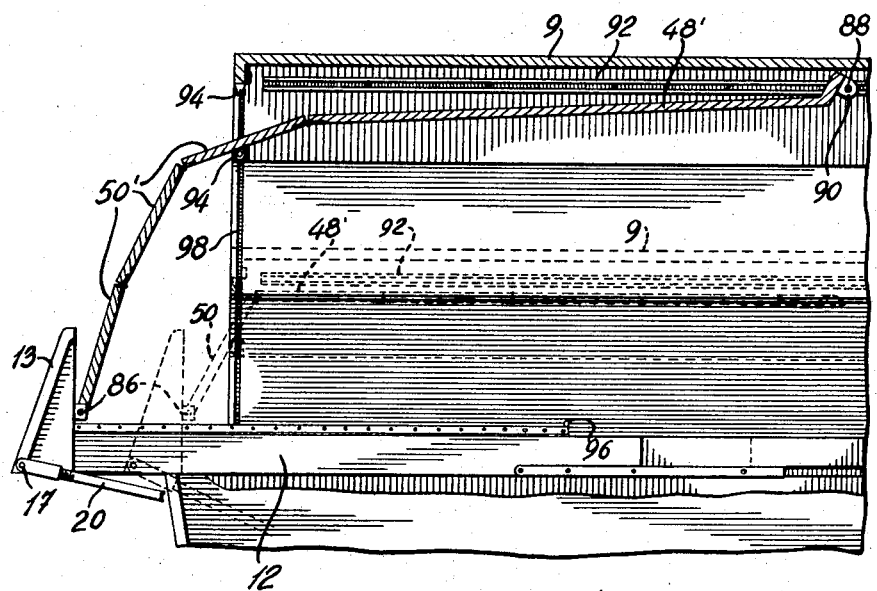
Fig.23
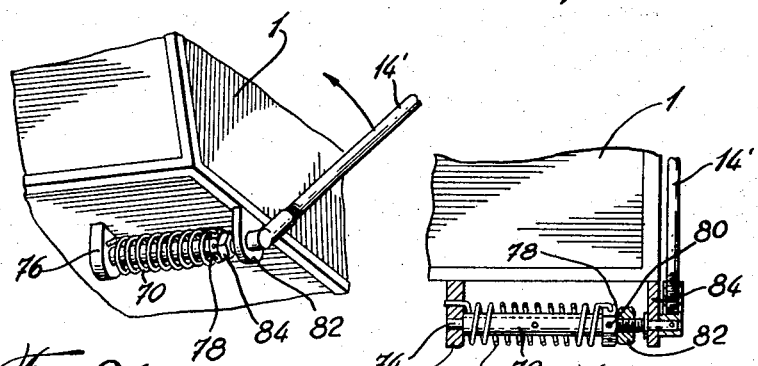
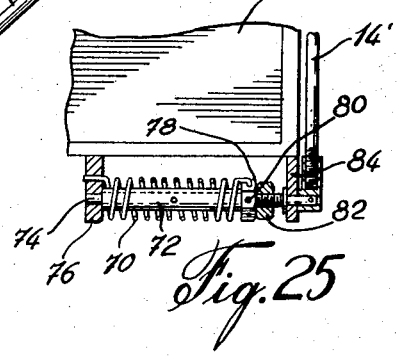
Fig.24   Fig.25
INVENTOR
René DONTIGNY
BY
ATTORNEY

FOLDING CAMPER TRAILER

The present invention relates to a camper trailer.

Various types of portable and mobile housing or shelters are available to people desiring to camp in the woods or in the countryside. One class of such shelter units consists of a box-like base body mounted on wheels and of a tent made of canvas material erectable over the box-like base; such units are often not too comfortable because they let humidity in and do not afford good heat insulation. Other housing units consist of a rigid full height box-like enclosure with doors. They afford comfortable well insulated living quarters but, because they necessarily must have sufficient height to accommodate standing persons, they produce considerable wind resistance when towed behind a motor vehicle; they are also heavy and hard on the engine of the motor vehicle.

Different attempts have been made to build a camper trailer having the low profile advantage of the tent like camper trailer, and the comfort of the rigid box-like mobile home. However, the resulting shelter units are difficult and time consuming to convert from collapsed to erected position and vice versa and often require a power source which is expensive. Also, they do not provide means for increasing the living space when in erected position, as compared to their collapsed travelling condition.

The camper trailer of my invention, which is believed to be a substantial improvement over known camper trailers, is of the type having a wheel-mounted rigid box over which a rigid top is provided to close the box and to serve as a roof for the trailer when it is raised above the box. The improvement of my invention resides in the combination comprising pairs of toggle levers, each provided at one corner of the box and formed with two hingedly interconnected levers of which the outer ends are pivotally connected to the top and to the box, respectively, in such a manner that the levers are displaceable in planes that extend in the direction of travel of the trailer. Manually slidable panels in the form of drawers are provided at each end of the box and carried by it for guided horizontal translation movement between a retracted stowaway position within the box and an extended useful position protruding from the box. The drawers and the pairs of toggle levers are interconnected by a link assembly in such a way that movement of the drawers causes actuation of the levers and displacement of the top relative to the box. The two drawers are interconnected by an operating means allowing simultaneous movement of the drawers between the abovementioned position upon movement of one of the drawers whereby the top may be raised above the box while keeping it horizontal.

In the preferred form of the invention, pivotally interconnected rigid wall sections are hinged to the top and to two sides of the box to form the lateral walls of the trailer, these sections being folded within the box in closed position of the trailer and extended upright in the raised position of the top. Furthermore, the operating means mentioned above comprises pulleys mounted for rotation inside the box and including outer pulleys located outwardly with respect to the inner ends of the drawers and also inner pulleys; first cables each connected to the inner end of one drawer, successively winding around outer and inner pulleys and connected at the other end thereof to the other drawer whereby pulling on one drawer causes automatic like retraction of the other drawer.

The foregoing and other objects of the invention will become more apparent during the following disclosure and by referring to the drawings, in which:

FIG. 1 is a side elevation of the camper trailer of the invention in closed, collapsed condition;

FIG. 2 is a side elevation of the camper trailer in erected position with the extended drawers partially enclosed;

FIG. 7 is a side elevation of the trailer camper in the condition shown in FIG. 6;

FIG. 8 is a partial side elevation of the roof raising mechanism operated by the drawer;

FIG. 9 is a partial cross-section taken along line 9—9 of FIG. 8, and shown on an enlarged scale;

FIG. 17, shown on the third sheet of drawings, is a partial elevation of the pivotal interconnection of the toggle lever system;

FIGS. 18, 19 and 20 are partial side elevation views of the trailer in collapsed, partially erected and fully erected condition, respectively, according to a second embodiment of the invention;

FIG. 21 is a cross-sectional view taken along line 21—21 of FIG. 20;

FIG. 22 is a cross-sectional view of a portion along one corner of the top of the trailer;

FIG. 23 is a partial cross-sectional view of the trailer in partially erected position;

FIG. 24 is a perspective view of the coil spring means for biassing the top toward open position;

FIG. 25 is a cross-sectional view of the coil spring means of FIG. 24.

In the drawings, like reference characters indicate like elements throughout.

The camper trailer of the invention comprises a generally rectangular box 1 opened at the top and mounted on a frame 2 supported by a pair of pneumatic tire wheels 3; the frame 2 has a draw bar 4 at the front end of the unit for hitching to the back of motor vehicle, such as a passenger car. If desired, tanks of fuel gas under pressure indicated at 5 may be mounted on the two bar 4 and used to supply a stove, a refrigerator, and the like, in the unit.

Figure 12:
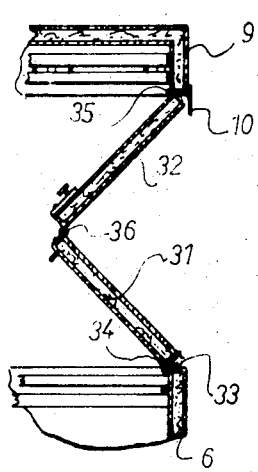
FIG. 12 is a partial cross-section of the box-like base, the top and the collapsible side walls of the camper trailer in partially collapsed condition of the latter.
Figure 13:
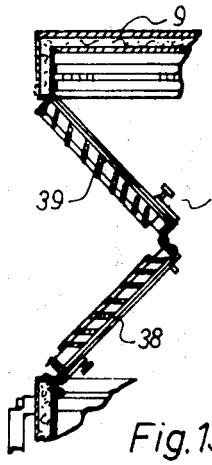
FIG. 13 is a partial cross-section of the box-like base, top and door sections of the camper trailer in a partially collapsed condition of the latter.
Figure 14:
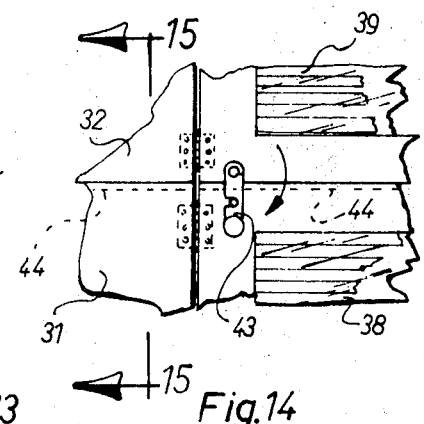
FIG. 14 is a partial side elevation of the side walls and door of the camper trailer.
Figure 11:
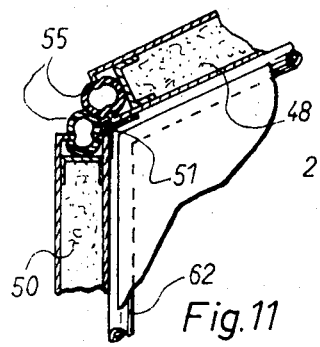
FIG. 11 is a partial cross-section of the roof section and end wall for the drawer showing their junction, said cross-section taken along line 11—11 of FIG. 3.

The box 1 has rigid, permanently secured side walls 6 and front and back walls 7 and 8. The floor of the box rests on frame 2. A rigid flanged top 9 is adapted to fit directly over the top edge of the side walls 6 when the unit is in collapsed condition. The top 9, when closed, effects a weather tight seal with the side walls 6, due to the presence of its flange 10, see FIG. 12, overlapping the side walls 6.

The front and back walls 7 and 8 of the box 1 are cut out near their upper edge to receive front and back drawers 11 and 12 respectively. These drawers are mounted by suitable means, such as rollers or the like, engaging guide rails supported by the side walls 6 of box 1 for guided translation movement in a plane substantially parallel to the floor of the box 1 and above the same substantially at the level of the top edge of the box 1. These drawers are movable between a retracted position in which the outer end panel 13 of the respective drawers overlaps and bears directly against the associated front and back walls 7 and 8, and an extended position, as shown for instance in FIG. 2, in which the drawers are fully extended and provide an increase in the living space of the erected shelter unit.

Pairs of toggle levers are arranged on both sides of the camper trailer near the four corners thereof; each pair of toggle levers include toggle levers 14, pivotally interconnected at one end at 15, while their outer ends are pivotally connected to the roof or top 9 and 16 and to the lower corner of the side wall 6 of box 1, at 17.

The toggle levers 14 of each pair are of substantially equal length and are adapted to break towards the center of the trailer camper unit. When operated simultaneously, the four pairs of toggle levers 14 serve to raise the top 9 and to lower the same while maintaining said top 9 substantially parallel to itself.

In order to counterbalance the weight of the top 9 and to assist in the raising of the same, a coil spring 18, as shown in FIGS. 8, 9 and 17, surrounds a flanged sleeve 19 mounted on the bolt constituting the pivotal interconnection 15 and has its legs extending along the two toggle levers 14 and bent to engage the same. The coil spring is so arranged that it is stressed when the toggle levers are folded and therefore urges the unfolding of said toggle levers.

A link 20, in the form of a rigid bar, is associated with each pair of toggle levers 14; link 20 is pivoted at 21 to the outer corner of the drawers 11 or 12, while the other end of the link has an elongated slot 22 for slidably receiving the bolt 15 constituting the pivotal interconnection of the pair of toggle levers 14; thus slot 22 forms a lost motion interconnection between the link 20 and the toggle levers 14.

In the closed position of the top, as shown in FIG. 1, the bolt 15 is at the end of slot 22 near pivot 21. When the drawer 11 or 12 is manually pulled, bolt 15 first slides in slot 22 with initial extending movement of the drawer, and then further extending movement of the drawer causes straightening movement of the toggle levers 14 and consequent raising of the top 9. Once the levers 14 are in straightened condition, as shown in FIG. 2, a stop plate 23, more particularly shown in FIGS. 8, 9 and 17, which is secured to one lever 14 adjacent the pivotal interconnection 15 and which is adapted to overlap the other lever, abuts the latter to prevent breaking of the levers 14 in the direction opposite to the normal folding movement of the levers.

In order to raise the top 9 while keeping the same in a plane parallel to itself, the four pairs of toggle levers must be simultaneously operated. For this purpose, the drawers are inter connected such that movement of one drawer will cause simultaneous movement of the other drawer towards the same position. This also enables to exert a pull or a push on only one drawer also to operate the other drawer. The means interconnecting the drawers are pulley and cable means. As shown in FIG. 7, pulleys 24 are mounted at suitable locations on the side walls 6 for free rotation about horizontal axes; for each side of each drawer, there are two cables 25 and 26; these cables are attached to the inner and outer corners of the drawer 12 and 27 and 28 respectively. The other end of cable 25 is attached at 29 to the outer end of drawer 11, while the other end of cable 26 is attached at 30 to the inner corner of the drawer 11. Thus, outward movement of one of the drawers 11 or 12 will cause simultaneous outward movement of the other drawer, and vice versa.

Consequently, the toggle levers will be operated simultaneously, and the top will be raised and lowered while maintained in parallel planes.

It will be noted that the lost motion connections consisting of the slots 22 in link bars 20 and of the bolts 15 riding in said slots, enable a greater translation movement of the drawers with respect to the movement of the bolts 15 during opening and closing of the top 9, thereby to further increase the space of the living quarters of the camper trailer when the same is in erected position, as compared to its collapse closed condition.

A pair of rigid wall sections 31, 32, extend on each side of the camper trailer unit. The bottom wall section 31 is hinged to the inside of side walls 6 along the top edge 33 of the latter, as shown at 34, while the top edge of the top wall section 32 is hinged at 35 along the inside of the edge of the flange of the top 9. The two wall sections 31, 32 are in turn mutually pivotally interconnected by a hinge 36 along their meeting edges.

In the closed position of the top, the wall sections 31 and 32 are folded one against the other about hinge 36 and extend within the box, while in the raised position of the top, they are in co-planar condition with their mutually hinged edges in abutment, and with their other longitudinal edges in abutment with the edges of the top 9 and of the side walls 6 of the box.

The camper trailer is provided with at least one door made in a side thereof; said door comprises a bottom door section 37 and for each wall section 31, 32, a door section 38, 39, respectively. The door section 37 to 39 are laterally hinged at 40 to the side walls 6 and at 41 and 42 to the wall sections 31, 32. The two door sections 38, 39 fold along with the wall sections 31 and 32.

When the camper trailer is in erected position, the door sections 37, 38, 39 are removably locked in coplanar condition by means of pivotable latches 43 at the free lateral edges of said sections.

At least one of the mating edges of the wall sections 31, 32, side walls 6 and top 9, and of the door sections 37, 38, 39 are provided with a deformable flexible sealing strip adapted to contact and be deformed by the edge of the adjacent panel in the straightened condition of said panels, so as to effect a weather-tight joint between the various panels and sections.

As shown, side wall sections 32 may be provided with windows 45 and with louver type windows 46; louver type windows 47 may be also fitted in the door sections 38, 39.

The drawers 11, 12 are adapted to be enclosed when in extended position by roof and wall sections, which, together with the drawers, form an extension of the living quarters of the camper trailer.

Figures 3, 5:
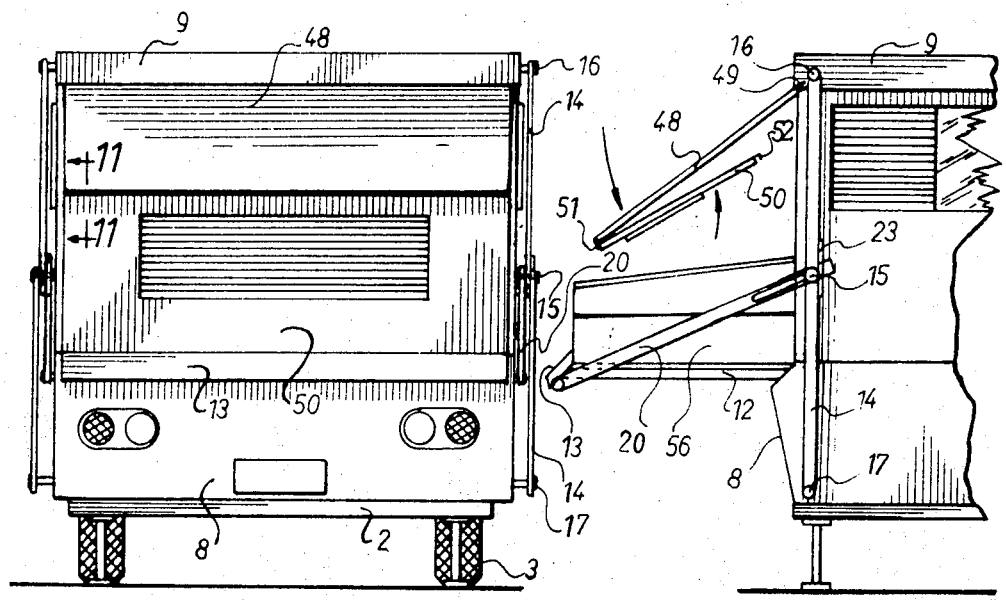
FIG. 3 is a back end elevation of the fully erected camper trailer.
FIG. 5 is a partial side elevation of the rear end of the trailer camper showing the roof, end wall and side wall sections for the rear drawer being folded.
Figures 4, 6:
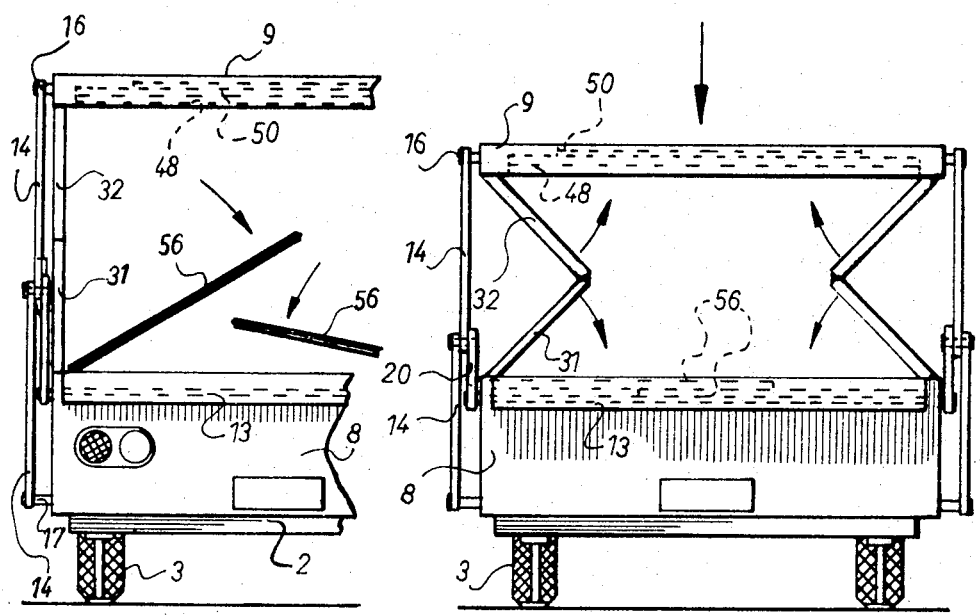
FIG. 4 is a partial back end elevation of the camper trailer, but showing the roof and end wall sections of the rear drawer in folded position, and the side walls of the rear drawer being folded.
FIG. 6 is a rear end elevation of the trailer camper with the roof and side walls in partially collapsed condition.
Figure 16:
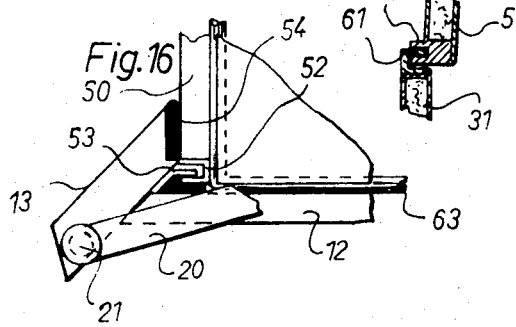
FIG. 16 is a partial side elevation of the arrangement of the extended drawer with the erected side and end walls therefore.

As shown in FIG. 5, a roof section 48 is hinged at 49 along the end of the top 9 and an end wall section 50 is hinged at 51 to the bottom edge of roof section 48, while its free bottom eege is provided with a channel 52 (see FIG. 16), adapted to receive in weathertight manner a strip 53 secured to outer drawer panel 13. The bottom edge of end wall 50 is adapted to overlap the top of panel 13 with the interposition of a sealing gasket 54.

The roof section 48 and the end wall section 50 are adapted to be folded one against the other about their mutual hinge 51 and about the hinge 49 to take a folded position underneath the top 9, as shown in FIG. 7. The mating edges of the sections 48, 50 are each provided with a longitudinally extending deformable sealing strip 55 adapted to contact each other and be deformed when the panels are in erected position, to effect a weather-proof joint.

Side panels 56 are hinged along their lower edge at 57 to each side of each drawer 11, 12 for movement between a collapsed overlapping position over the drawer, and an upright position on each side of the drawer. In said upright position, the external edges of the panel 56 overlap and engage a flange 58 of the roof section 48 and of the end wall section 50 and are removably locked in this upright position by a leaf spring catch 59, shown in FIG. 10, carried by the end wall section 50 and which may be accessible from the outside of the shelter unit. The other upright edge of the side panel 56 forms an outwardly directed channel 60 engageable in a weathertight manner with an inturned lip 61 provided along the end edges of the side wall sections 31 and 32.

Figure 10:
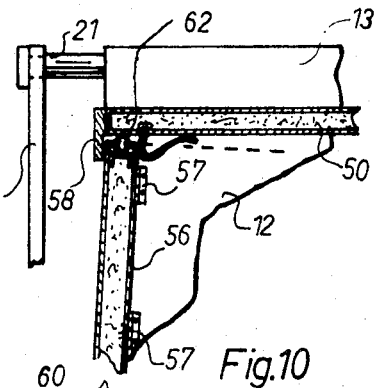
FIG. 10 is a partial plan section of the assembly of the drawers and walls therefore and taken along line 10—10 of FIG. 2.
Figure 15:
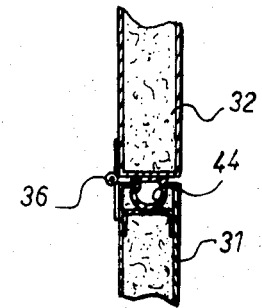
FIG. 15 is a partial cross-section taken along line 15—15 of FIG. 14.

Preferably, as shown in FIG. 10, the side panels 56 are hinged to the drawers 11 or 12, along an axis inclined with respect to the end wall 50, so that the deformable weather-strip 62 along the outer upright edge of the panel 56 will frictionally engage the end wall section 50 only at the terminal portion of the pivotal movement of the panel 56.

Inclined roof section 48, end wall section 50 and side panels 56 for each drawer form a complete enclosure on top of the drawer and in communication with the inside of the camper trailer.

The side panels 56, when locked in upright position, lock the drawers in extended position and, consequently, prevent collapse of the toggle levers 14, and also lock the side wall sections 31 and 32 against folding movement. The bottom edges of the panels 56, together with their top edges, are provided with deformable weather-strip 63 to make a weathertight joint with the drawer 12 and with the roof section 48, respectively.

It will be noted that the drawers 11, 12 and the drawers enclosing roof and wall sections have a slightly small width than the width of the box 1, so as to be accommodated within said box in the closed position of the camper trailer.

The drawers provided sufficient space when in extended position to support mattresses for use as beds.

From the foregoing, it is seen that a trailer camper in accordance with the invention provides, when erected, standing room and yet has a very low profile when in closed position for ease in towing the unit.

It is easily and very quickly converted from closed to erected position, and vice versa, by a manual force exerted on one or the other of the drawers, and the drawer enclosure roof section and panels are easily moved between folded and erected position.

Latching devices are disposed at suitable locations for latching the various elements in collapsed or erected condition; for instance, such devices will normally be required to latch the closed top to the box.

The roof and walls of the camper trailer are preferably made of two metal sheets with intervening heat insulating material.

In the embodiment of FIGS. 18 to 25, the toggle levers are pivotally interconnected at 21', as in the first instance, but the link 20' rather than being connected to the levers 14' through a lost motion mechanism is connected through a pivot 21''. Furthermore, the coil spring means is at the lower end of the lever 14', as shown in FIGS. 24 and 25, rather than about the two levers 14 as in the first embodiment.

For this purpose, a coil spring 70, loosely wound around a sleeve 72 fast with an axle 74, has one end fixed to a bracket 76 depending from the bottom of the box 1 and the other end fixed to an adjusting nut 78, loose with respect to the sleeve 72. The latter has a series of holes 80 for the insertion of an adjusting tool (not shown). Once proper tension is obtained in the spring 70, a nut 82 tightens the adjusting nut 78 against the sleeve 72, to hold the tension in the spring. The axle 74 is journaled in the bracket 76 and a further bracket 84, being then secured to the operating lever 14'.

In this embodiment, the end wall enclosing the drawer is formed of three sections 50' (FIGS. 19, 20, 23) hinged to one another and to the roof section 48'. However, the latter rather than being pivoted to the top 9 as in the first instance is guided inside the top 9 as shown in FIG. 23, particularly. As to the free edge of the lowermost section 50' it is pivoted, at 86, to the outer end of the drawer 12.

Guiding of the roof section 48' may be by means of lugs 88 laterally projecting from brackets 90 at the ends of the section 48', the lugs 88 being received in guide channels 92 fastened on the inside of the top 9, as shown in FIG. 23. Thus, the roof section 48' and end walls sections 50' are automatically pulled out of the box 9 into the position shown in FIG. 20 when the trailer is erected, rollers 94 on the top 9 being used to guide roof and end wall sections. Likewise, the said sections are drawn into the top 9 as the latter collapses over the box 1.

As illustrated in FIG. 21, the side panels 56, forming part of the enclosure above the drawer 12, interlocks with the side wall sections 31, 32 by means of a flange 96 nesting into a groove 98 of sections 31, 32.

While preferred embodiments of the invention have been illustrated and described, it is understood that various modifications may be resorted to without departing from the scope of the appended claims.

I claim:

1. A camper trailer having a wheel-mounted rigid box, a rigid top for closing said box and for serving as a roof for said camper trailer when raised above said box, the improvement therewith comprising:

pairs of toggle levers, each at one corner of said box and formed of two hingedly interconnected levers of which the other ends are pivotally connected to said top and to said box, respectively, in a manner such that the levers are displaceable in planes extending in the direction of travel of said trailer;

manually slidable drawers at each end of said box and carried thereby for guided horizontal translation movement between a retracted stowaway position within said box and an extended useful position protruding from said box;

link means interconnecting said drawers and said pairs of toggle levers so that movement of said drawers cause actuation of said levers and displacement of said top relative to said box and operating means interconnecting said two drawers for simultaneous movement thereof between said positions upon one only of said drawers being moved whereby said top may be raised above said box while being kept substantially horizontal.

2. A camper trailer as claimed in claim 1, wherein said box is four sided and further including pivotally interconnected rigid wall sections hinged to said top and to two sides of said box so as to be foldable within said box in closed position thereof and extendable in the raised position of said top, and further including side panels hinged to the sides of said drawer and openable to upstand from said drawer and to engage said wall sections to lock said drawer in extended position.

3. A camper trailer as claimed in claim 2, further including pivotally interconnected drawer enclosing rigid end wall and roof sections hinged to said top and pivotable between a stowaway folded position under said top and a useful position forming a roof and an end wall for said drawer.

4. A camper trailer as claimed in claim 1, wherein said drawer operating means comprises pulleys mounted for rotation inside said box and including outer pulleys located outwardly with respect to the inner ends of said drawers and inner pulleys; cables each connected to the inner end of one drawer, successively winding around outer and inner pulleys and connected at the other end thereof to the other drawer, whereby pulling on one drawer causes automatic withdrawal of the other drawer.

5. A camper trailer as claimed in claim 2, further including a door for said camper trailer located on one side of said box, said door consisting of a bottom door panel and of as many additional door panels as there are rigid wall sections on said last named side of said box, said bottom door panel laterally hinged in a door opening in said side of said box and said additional door panels laterally hinged in door openings in said rigid wall sections, and latch means releasably to latch said door panels together in coplanar condition.

6. A camper trailer as claimed in claim 1, wherein said box is of rectangular shape and has a floor and end walls, said drawer mounted for movement longitudinally of said box in a plane substantially parallel to said floor just above the top edge of one of said end walls.

7. A camper trailer as claimed in claim 1, wherein said box is of rectangular shape and has a floor and end walls there being two drawers each located at one of said box and further including operating means interconnecting said two drawers for simultaneous movement of said two drawers between extended and retracted positions respectively upon an operating force exerted on only one of said drawers.

8. A camper trailer as claimed in claim 1, further including spring means associated with said raising mechanism and stressed upon lowering movement of said top to assist in the raising of said top.

9. A camper trailer as claimed in claim 1, further including coil spring means surrounding the hinge interconnection of said toggle levers and having ends engaging said toggle levers so as to be stressed when said toggle levers are folded about their hinge interconnection.

10. A camper trailer as claimed in claim 1, wherein said link means consist of rigid bars pivotally connected at one end to said drawers and having a lost motion pivotal connection with the pivotal interconnection of said toggle levers to permit a greater movement of said drawer between retracted and extended position than permissible with the movement of only said hinge interconnection between folded and straightened positions of said toggle levers.

11. A camper trailer as claimed in claim 10, wherein said box is four sided and has a floor, there being two drawers located at two opposite sides of said box, each mounted for guided translation movement in a plane substantially parallel to said floor just above the top edge of an associated box side, the pivoting attachment of said rigid bars to said drawers being disposed, in the closed position of said top, between the pivotal connections of the respective toggle levers to said box and to said top.

12. A camper trailer as claimed in claim 10, further including stop means associated with and engaging said toggle levers in their straightened position to prevent breaking of said straightened toggle levers in a direction opposite to their normal folding direction.

13. A camper trailer as claimed in claim 2, wherein said pivotally interconnected rigid wall sections have the pivotal edges thereof facing each other in straightened position of said wall sections, at least one of said pivotal edges being provided with a deformable sealing strip adapted to engage and be deformed by the pivotal edge of the adjacent rigid wall section in the straightened position of said wall sections so as to seal the joint therebetween.

14. A camper trailer as claimed in claim 3, wherein said pivotally interconnected drawer enclosing rigid wall and roof sections have their hinged adjacent edges each provided with a deformable sealing strip extending along said edges and engageable with each other in the operative position of said wall and roof sections to effect sealing of the joint between said sections.

15. A camper trailer as claimed in claim 1, wherein said link means are rigid bars pivotally connected at one end to said drawers and at the other end, to the hinged ends of said toggle levers.

16. A camper trailer as claimed in claim 15, including coil spring means at the end of said toggle levers pivotally connected to said box and cooperable with said box to bias said toggle levers toward extended position and said top away from said box.

17. A camper trailer as claimed in claim 2, further including enclosure forming end walls and a roof section hingedly interconnected in succession; means between said top and the free end of said roof section for guiding said free end of said roof section in horizontal displacement along said top as the latter collapses on said box or moves away therefrom, and means pivotally interconnecting the free edge of the last one of said end walls to the outer end of said drawer.

* * * * *